(12) United States Patent
Durham et al.

(10) Patent No.: US 7,558,966 B2
(45) Date of Patent: Jul. 7, 2009

(54) NOTIFYING REMOTE ADMINISTRATOR OF PLATFORM INTEGRITY DETERMINATION

(75) Inventors: David M. Durham, Hillsboro, OR (US); Travis T. Schluessler, Hillsboro, OR (US); Raj Yavatkar, Portland, OR (US); Vincent J. Zimmer, Federal Way, WA (US); Carey W. Smith, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 966 days.

(21) Appl. No.: 10/865,354

(22) Filed: Jun. 9, 2004

(65) Prior Publication Data

US 2005/0278563 A1   Dec. 15, 2005

(51) Int. Cl.
*G06F 11/30* (2006.01)
*G06F 12/14* (2006.01)
*H04L 9/32* (2006.01)

(52) U.S. Cl. .......................................... 713/187; 714/25
(58) Field of Classification Search .................. 713/187
See application file for complete search history.

(56) References Cited

U.S. PATENT DOCUMENTS

| | | | |
|---|---|---|---|
| 5,280,627 A * | 1/1994 | Flaherty et al. | 713/2 |
| 5,675,800 A * | 10/1997 | Fisher et al. | 713/2 |
| 5,732,268 A * | 3/1998 | Bizzarri | 713/2 |
| 5,844,986 A | 12/1998 | Davis | |
| 5,859,911 A * | 1/1999 | Angelo et al. | 713/187 |
| 5,953,502 A | 9/1999 | Helbig, Sr. | |
| 6,275,851 B1 * | 8/2001 | Cromer et al. | 709/217 |
| 6,539,473 B1 * | 3/2003 | Hubacher et al. | 713/2 |
| 6,625,729 B1 * | 9/2003 | Angelo et al. | 713/2 |
| 6,732,267 B1 * | 5/2004 | Wu et al. | 713/100 |
| 6,748,423 B1 * | 6/2004 | Khanna et al. | 709/210 |
| 7,225,245 B2 * | 5/2007 | Gurumoorthy et al. | 709/223 |
| 2002/0166062 A1 | 11/2002 | Helbig, Sr. | |
| 2005/0278563 A1 | 12/2005 | Durham et al. | |

OTHER PUBLICATIONS

Logica Clef (LFL), 3Com Embedded Firewall 1.5.1 Evaluated Configuaration Guide, Apr. 7, 2003, (12 pages), 00-0937471-D, Logica UK Ltd. Chaucer House, Leatherhead.
Notice of Allowance mailed Sep. 19, 2008 for U.S. Appl. No. 10/865,144.
Office Action mailed Apr. 1, 2008 for U.S. Appl. No. 10/865,144.

* cited by examiner

*Primary Examiner*—Kambiz Zand
*Assistant Examiner*—Dant B Shaifer Harriman
(74) *Attorney, Agent, or Firm*—Blakely, Sokoloff, Taylor & Zafman LLP (57) ABSTRACT

Method and Apparatuses for determining integrity of a platform and notifying a remote system. In one embodiment a verification agent accesses a portion of a memory on the platform at initialization of the platform to determine if the data has been compromised or corrupted. The verification agent causes the information to be transmitted to a remote system. The verification agent may be local to the platform for which integrity is determined, and transmit the information to a remote administrator. Alternatively, the agent may access the platform over a bus or private channel, or a network connection and indicate information regarding the verification process to an entity remote to the tested platform.

18 Claims, 4 Drawing Sheets

NOTIFYING REMOTE ADMINISTRATOR OF PLATFORM INTEGRITY DETERMINATION

RELATED APPLICATIONS

This Application is related to U.S. patent application Ser. No. 10/865,144, entitled "Establishing Sanctity of Software Images," having common Inventorship, and filed concurrently herewith.

FIELD

Embodiments of the invention relate to system integrity, and particularly to a system having an intelligent networked device to verify system integrity at system initialization.

BACKGROUND

At system boot-up, a validation of the sanctity of the system's basic input output system (BIOS) or another initialization module may be performed. If a security breach is detected, the boot-up may be halted or the system rebooted. One validation technique involves the use of a Trusted Platform module (TPM), which relies on data at a boot block-based core root of trust for measurement (CRTM) portion of the BIOS for validation of the BIOS. Because the domain under measurement is also performing the measurement, this technique and similar techniques may suffer from Heisenburg's Uncertainty Principle.

Current validation methods also suffer in recovering from errors. If the CRTM is in fact inviolate but has detected a security compromise in the main firmware, the BIOS is traditionally unable to recover alone from the security compromise. The firmware would need to be updated/corrected from a source external to the BIOS, which traditionally cannot be accessed due to the fact that the compromised BIOS will not be executed to allow access to error correction. Furthermore, traditional systems do not provide notification to an administrative entity of the security breach.

BRIEF DESCRIPTION OF THE DRAWINGS

The description of embodiments of the invention includes various illustrations by way of example, and not by way of limitation in the figures and accompanying drawings.

DETAILED DESCRIPTION

Figure 1:
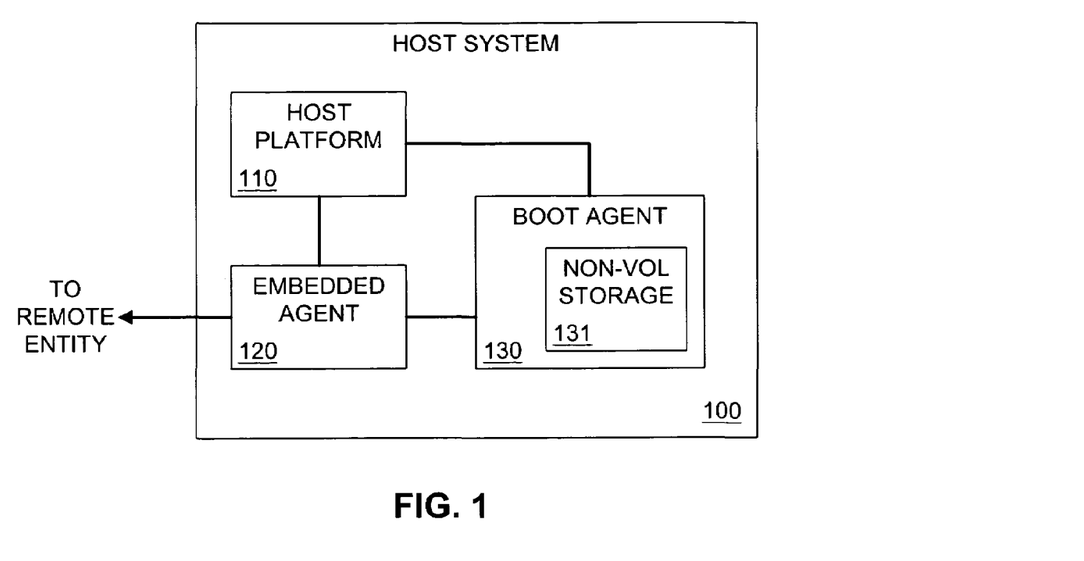
FIG. 1 is a block diagram of a system having an embedded agent in accordance with one embodiment of the invention.

FIG. 1 is a block diagram of a system having an embedded agent in accordance with one embodiment of the invention. Host system 100 includes host platform 110 that represents the main computational core of system 100. A platform refers generally to a computing environment, whether hardware or software. A hardware platform may be understood as including a processor and a subsystem, a chipset (one or more hardware elements, potentially with associated circuitry), a circuit, or other computational environment of system 100. A software platform may be understood as an operating system, host program, etc. Platform 110 may include, but is not limited to having, memory/storage hubs and/or controllers, input/output (I/O) hubs and/or controllers, memory subsystems, peripheral controllers, a central processor, system interfaces, etc. Alternatively, host system 100 may be a peripheral device, and host platform 110 may represent the computational core of the peripheral device, for example, a microcontroller, a processor, control logic, peripheral interfaces/controllers, etc. When host system 100 is operational, the flow of system operations is controlled by host platform 110.

In one embodiment host system 100 includes boot agent 130, which represents a subsystem of host system 100 to provide instructions and/or signals for boot-up of system 100. Boot-up may be understood as including a series or sequence of operations at start-up of system 100, or other system initialization. System initialization may include an event or sequence of events that cause system 100 to exit a state of execution and perform operations such as check hardware systems, load initial or other default values, and may include clearing settings and/or values of internal variables, etc.

In one embodiment boot agent 130 includes non-volatile storage 131, which represents a persistent storage device/subsystem. A persistent storage may be a memory/storage that maintains its value even when system 100 loses/cycles power. Non-volatile storage 131 may be contrasted to temporary memory, which may include generated values and/or values used only during system execution. In one embodiment boot agent 130 may consist only of non-volatile storage 131, which may or may not include logic and/or interfaces to read and/or write the storage, etc. In other embodiments boot agent 130 includes circuitry to execute initialization operations, including, but not limited to checking/setting values, verifying system hardware, loading drivers, etc. In one embodiment non-volatile storage 131 is controlled/managed by boot agent 130, and is not physically part of boot agent 130.

Host platform 110 may have access to boot agent 130, including non-volatile storage 131. Thus, hardware from host platform 110 may be able to read, write, and/or otherwise manipulate values in a persistent boot memory, managed by boot agent 130. Boot agent 130 and host platform 110 may be able to exchange data/instructions over an interconnection, for example, a system bus. For example, boot agent 130 may provide instructions from a boot memory to be executed on host platform 110.

System 100 also includes embedded agent 120, which represents hardware and/or firmware embedded in system 100 to perform specialized functions. Embedded agent 120, while shown as a separate entity in system 100, may be included in hardware and/or firmware of components that make up host platform 110 and/or boot agent 130. Thus, in one embodiment embedded agent 120 could be understood as a stand-alone physical device/subsystem, and in another embodiment could be understood as a logical combination of components/modules that make up a device/subsystem, where the components/modules potentially span multiple subsystems.

Embedded agent 120 includes communicative coupling with boot agent 130 and/or non-volatile storage 131, or a persistent boot memory of system 100. Embedded agent 120 validates some or all of the boot memory. For example, embedded agent 120 may read a portion of a boot memory and determine sanctity of the information via checksum, hash function, cryptographic hash function, or other validation algorithm. An algorithm may produce a result that can be compared against a known value, or some expected value. In one embodiment embedded agent 120 transmits a validation algorithm result and/or a determination of integrity to an entity over a network connection. In one embodiment host system 100 is a subsystem of a more inclusive device, and embedded agent 120 transmits results and/or system data to an entity remote to host system 100, but on the more inclusive device. In this way, a remote networked entity could be informed of a security compromise or corruption of system 100 automatically, at boot-up, and prior to a compromised or corrupted system 100 becoming active. Note that the network or inter-subsystem communication link over which embedded agent 120 transmits validation information may be private, secure, encrypted, or otherwise designed for security.

Figure 2:
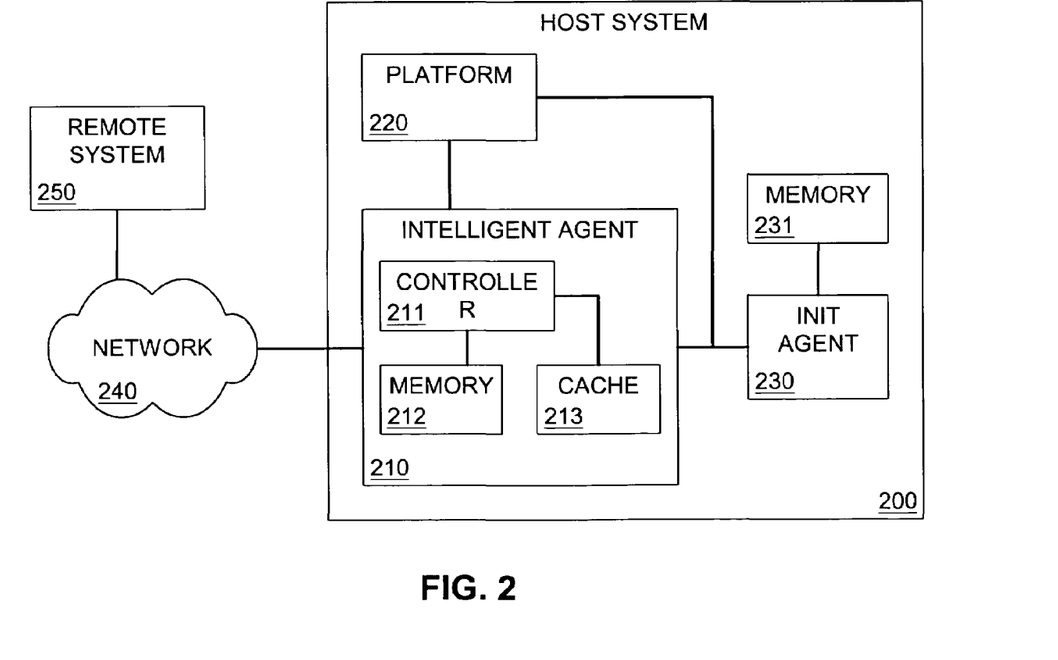
FIG. 2 is a block diagram of a system having an agent connected to a network in accordance with one embodiment of the invention.

FIG. 2 is a block diagram of a system having an agent connected to a network in accordance with one embodiment of the invention. Host system 200 represents a variety of electronic systems or devices. For example, host system 200 may include a personal computer (desktop, laptop, palmtop), a handheld computing device, personal digital assistant, wireless computing device, set-top box, or other electronic device having a main platform and peripheral subsystem, etc. System 200 may include any system or subsystem for which firmware and/or initialization information may be verified/validated, for example, a BIOS, a hard disk drive, a video interface, a sound interface, a network interface, a wireless interface, etc.

Host system 200 includes intelligent agent 210, which may in one embodiment be an embedded agent in host system 200. For example, intelligent agent 210 may be embedded on a subsystem of system 200, or may generically be considered a subsystem on platform 220. In one embodiment intelligent agent 210 includes controller 211, memory 212, and cache 213. These are to be understood merely as illustrative, and intelligent agent 210 may include more or fewer components than what is shown in FIG. 2. Controller 211 represents one or more, or a combination of: a microcontroller, microprocessor, digital signal processor (DSP), logic array, programmable array, application specific integrated circuit, etc., that controls the flow of instructions and the execution of instructions of agent 210.

Thus, agent 210 may be a separate physical circuit having potentially various components. Alternatively, agent 210 may be physically part of other circuits of system 200, for example, agent 210 may exist as firmware/software executed on hardware of platform 220. Thus, controller 211 may include one or more processors/controllers of other circuits that perform operations of intelligent agent 210.

In one embodiment agent 210 includes memory 212 and/or cache 213. Memory 212 and/or cache 213 may include one or more of: read-only memory (ROM), random access memory (RAM), flash, registers, etc., on which agent 210 may store values generated during/for execution of the functions of agent 210. Additionally, agent 210 may access memory 212 and/or cache 213 for data, information, and/or instructions for execution. Note that the storage devices may not necessarily be physically located on the same physical system as controller 211.

Agent 210 accesses initialization agent 230 to read information from a boot/initialization memory, such as memory 231, which represents a memory or portion of a memory storing boot or initialization information. Agent 210 may access init agent 230 via a peripheral component interconnect (PCI) bus, a serial peripheral interface (SPI), universal serial bus (USB), another standards-based interconnection, a proprietary interconnection, etc. Accessing init agent 230 may include reading firmware of a subsystem controller. Intelligent agent 210 may use init agent 230 as an access mechanism for reading memory 231. After accessing the information, agent 210 may perform a determination of the integrity of the read portion.

In one embodiment agent 210 indicates to remote system 250 the determination of integrity over network 240. Indicating the determination may include transmitting results of a determination algorithm, sending a signal of an agreed format indicating the system is secure, transmitting a security "heartbeat," indicating identification data of host system 200, etc. In one embodiment agent 210 only indicates when system security has been compromised (e.g., indicating a breach, refraining from transmitting a heartbeat). Remote system 250 may store the information, or remote system 250 may be a system that will perform operations in response to the information. For example, remote system 250 may be part of a network administration system, e.g., the remote administrator, a security log/database, an administrative agent, etc.

Intelligent agent 210 includes a communication link over network 240 in one embodiment. The communication link may be a channel over the same physical line as a network link of system 200, or the communication link may be a communication channel private to intelligent agent 210 and transparent to host system 200. Thus, platform 220 may have access to network 240, but not access to a link used by agent 210 to communicate security determinations to remote system 250. The link used by agent 210 may comply with the transport layer security (TLS) protocol, secure sockets link (SSL) protocol, Internet Protocol Security (IPsec), Wired Equivalent Privacy (WEP), etc.

Platform 220 represents the computing environment of system 200 with which init agent 230 and intelligent agent 210 are coupled. Platform 220 may include peripheral devices/cards. Platform 220 may be coupled with init agent 230, either directly or through a connection to a subsystem on which init agent 230 resides. For example, init agent 230 may reside on a network interface circuit that is connected to platform 220 on a system bus. Thus, platform 220 may not directly interconnect with init agent 230, but interconnect due to the fact that init agent 230 interconnects with a circuit that interfaces with platform 220. In one embodiment platform 220 is an input/output controller hub. Alternatively, platform 220 may be a computing core including memory control, input/output (I/O) control, peripherals, etc.

Platform 220 may also interconnect, either directly or indirectly, with intelligent agent 210. In one embodiment intelligent agent 210 is independent of platform 220 and/or any software/firmware that may be executed on platform 220. Thus, for example, a main operating environment or operating system on platform 220 would be unable to directly access and/or modify intelligent agent 210. In such an environment the validation of the initialization settings of a particular peripheral may not suffer from Heisenburg's Uncertainty Principle, in that the testing system is independent/isolated from the system being tested. Such an environment may also provide a circumstance less susceptible to compromise, and thus more secure. This is because intelligent agent 210 that provides for validation/verification of integrity of one or more aspects of host system 200 would be inaccessible to host system 200. Even if, e.g., a BIOS, an operating system (OS), of system 200 were compromised or corrupted, the validation system may be inaccessible to compromise by whatever breached the BIOS/OS.

In one embodiment intelligent agent 210 is independent of host system 200 because it is inaccessible to be written to by host system 200. In another embodiment agent 210 is inaccessible by host system 200 for reading or writing. Intelligent agent 210 may be considered to be isolated from platform 220 in that the platform may be unable to write and/or read/write agent 210. Intelligent agent 210 may also be isolated from platform 220 in that agent 210 may have private interconnections to the subsystem to be validated and/or private network interconnectivity. Private interconnections may be maintained isolated from system buses in system 200 that may be accessible to other subsystems of host system 200.

Figure 3:
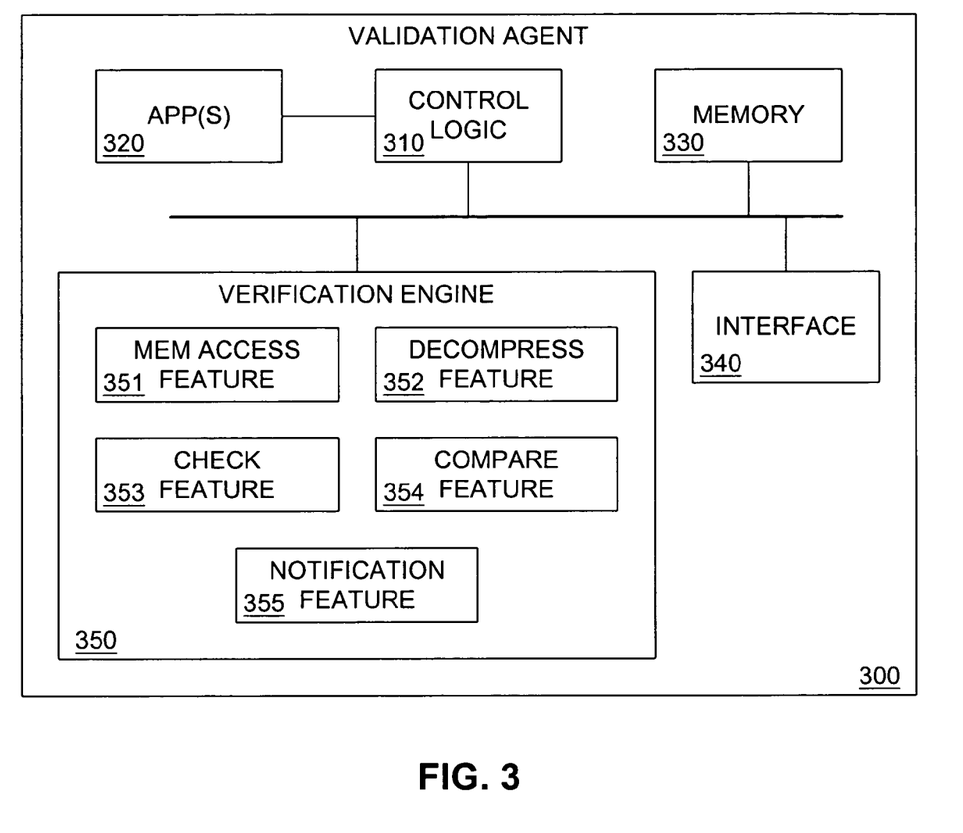
FIG. 3 is a block diagram of a validation agent in accordance with one embodiment of the invention.

FIG. 3 is a block diagram of a validation agent in accordance with one embodiment of the invention. Validation agent 300 represents a circuit, a combination of logic, firmware or other group/series of instructions for execution on a computation/logic device, a subsystem, or a virtual subsystem that is configured, enabled, or otherwise able to perform validation operations. Control logic 310 directs the flow of operation of agent 300. In one embodiment, control logic 310 is a series of software/firmware instructions to perform logic operations. In another embodiment, control logic 310 can be implemented by hardware control logic, or a combination of hardware-based control logic and software instructions.

Interface 340 provides a communications interface between agent 300 and an external electronic system (not shown). For example, agent 300 as part of a computing system may have interfaces 340 provide a communications interface between agent 300 and the system via a system bus. In one embodiment interface 340 includes a communications path to a network. For example, interface 340 may include an interface to an Ethernet, Internet, wireless communication channel, etc. The communication path may be private to agent 300, shared with other agents, or an access path more widely available to a system of which agent 300 is a part. If the communication path is shared, it could be arbitrated, as is understood in the art.

Agent 300 may include applications 320. Applications 320 represent programs and/or other series of instruction sequences that are executed on control logic 310. In one embodiment agent 300 may execute part of all of a user application or a system application. Applications 320 may provide instructions to control logic 310 to cause agent 300 to perform operations. Instructions may also be provided to control logic 310 by memory 330. For example, control logic 310 may access, or read a portion of memory 330 to obtain instructions to perform a series of operations and/or data for use with operations.

Thus, control logic 310 can receive one or more instructions from internal application software running locally on validation agent 300, such as applications 320, from memory 330, and/or from external applications, storage media, etc. through interface 340. Agent 300 is not necessarily local to a communication system for which it provides validation services. For example, interface 340 may provide a communications interface between agent 300 and an electronic system, e.g., over a network, allowing agent 300 to be remote from the system it validates.

Agent 300 includes verification engine 350. In one embodiment agent 300 verifies, validates, checks integrity, etc., of a system against potential system compromise, corruption, security breach, etc. Verification engine 350 is shown with various features, which represent functions or features that verification engine 350 may provide. Each function or feature is provided through performing one or more operations. Verification engine 350 may include one or more of: memory access feature 351, decompress feature 352, check feature 353, compare feature 354, and notification feature 355. In one embodiment one or more of these features may exist independently of and/or be external to agent 300. Thus, verification engine 350 may be more complex or less complex, containing some, all, or additional features to those represented in FIG. 3.

Memory access feature 351 enables agent 300 to access a memory or other storage structure, device, and/or medium. For example, a memory may include information pertinent to an initialization routine or a boot-up sequence. Information is pertinent when it includes settings, data, instructions, code, etc., relating to execution of the initialization routine or boot sequence. In one embodiment agent 300 accesses a memory to read a portion of the memory that will be validated prior to continuing with initialization. For example, the memory could include a BIOS of a computer system, which could be validated at boot-up. In one embodiment memory access feature 351 provides a communication interface (e.g., bus, channel, serial line) between agent 300 and the memory to be accessed. The communication interface may be private (e.g., accessible to selected system components, such as agent 300) or alternatively, public (e.g., a system bus).

Decompress feature 352 enables agent 300 to read compressed data. In one embodiment decompress feature 352 is used in conjunction with memory access feature 351. If a portion of data read from a memory is compressed, the data may need to be decompressed to be validated. To the extent that data needs to be decompressed to be validated, decompress feature 352 enables agent 300 to extract the data in preparation for other operations to be performed on the data.

Check feature 353 enables agent 300 to perform a checking algorithm or sequence on data to be verified/validated. In one embodiment check feature 353 may include a checksum or checksum-like algorithm. Thus, a number of bits and/or bytes may be determined for a given portion of data. In one embodiment check feature 353 includes a hashing function that performs hashing algorithm on a portion of data to be verified. For example, if a portion of initialization data for a peripheral card of a computing device were to be verified, the portion of data to be verified could be obtained, and a hash performed on the data. The hash algorithm may produce one or more bytes of data as a result or intermediate result. A result is one in which the hash function has completed operation, whereas an intermediate result is any result obtained after which the algorithm may continue to perform other operations. Herein result will be understood to include final results as well as intermediate results. The byte or bytes of result or intermediate result may uniquely represent the data. In one embodiment a cryptographic hash is used. A cryptographic hash refers to a hash that is performed using a cryptographic, or secure key to perform the algorithm. Normal methods of cryptographic key storage and security maintenance could be used, as is known in the art. In one embodiment the accessing and/or checking of data may be performed from agent 300 that is remote (e.g., separated by a bus, separated by a network) to the tested system.

Compare feature 354 enables agent 300 to validate results obtained/derived/generated from a portion of data to be verified against an expected result. In one embodiment the expected result is the anticipated outcome of a hashing function. In another embodiment the expected result is a known value. The anticipated outcome or the known value may, for example, be values obtained in a previous determination of a hash function on the portion of the data to be verified. Such a previous determination may be stored for later comparison purposes, transmitted to another feature or another entity internal or external to agent 300. Storing and/or transmitting may be performed in a secure manner. In another embodiment an expected result may be computed or derived prior to comparing.

In one embodiment compare feature 354 compares a result against an expected value from a network source. For example, a result may be obtained from the system to be validated, and an expected value is obtained from a storage device remote to agent 300. When obtaining an expected value and/or results from remote locations, the link over which the expected value/result is transmitted may be secure and/or authenticated.

Notification feature 355 enables agent 300 to e.g., communicate, notify, transmit, send data from agent 300 to another entity. Notification feature 355 may identify the entity by the use of a preconfigured address on a bus/network. In one embodiment notification feature 355 includes a communication link, which may be private, to another entity, such as another agent, in a system. Thus, agent 300 may communicate with another agent, e.g., a cooperating agent, in a system. Alternatively, notification feature 355 may include a communication link over a network to allow agent 300 to transmit information over a network to a remote entity. In one embodiment the remote entity is a remote system. The remote entity may be an administrative entity or agent.

For example, agent 300 may be embedded in a system having a network card. The network card may contain an initialization block that will be validation by agent 300 through verification engine 350 at start-up of the card. Agent 300 may access information that is determined to be integral. In one embodiment a determination that integrity of the system is good causes agent 300 to notify via notification feature 355 a remote monitoring agent, e.g., via a "heartbeat" signal, that the system is integral. In an alternate embodiment, a determination that no breach of system integrity has occurred causes agent 300 to not send any signal. In the case that an integrity breach is determined, agent 300 may cause notification feature 355 to indicate to a network administrator that an integrity breach has been detected. In addition to sending information directly relating to the integrity of the tested system, notification feature 354 may also indicate identification information of the tested system.

In one embodiment a system administrator will act upon the notified determination by causing the system of which agent 300 is a part to be isolated from the network. For example, a remote system could indicate to agent 300 through notification feature 355, or through interface 340 or another means, that the system boot-up or initialization should be halted. Alternatively initialization could be restarted for another attempt. In another embodiment a system administrator could reprogram a non-volatile storage or cause a non-volatile storage to be reprogrammed to result in the non-volatile storage having the correct image of one or more system settings/files/data. Other instructions from a remote entity could cause agent 300 to perform operations such as preventing use of a network connection, preventing use of a system bus, running a self-diagnostic, etc. While this example has been described with reference to a network card, it will be appreciated that a BIOS, a video card, etc., may be involved.

In one embodiment agent 300 may be implemented in whole or in part with one or more modules in a secure management or system diagnostic mode. For example, in a personal computing environment a secure management mode (SMM) may be used. A secure management interrupt may be triggered at initialization of a system, causing the system to enter SMM or its equivalent, which then performs one or more of the validation functions described above. SMM may function by having an area of a host hard drive or storage that is transparent to an operating system or application executed on the host platform. When a trigger or interrupt occurs, control is switched to the SMM portion of the storage device and the SMM module(s) executed. This may be performed prior to loading the host OS.

In one embodiment agent 300 is implemented with firmware, software, or a combination of firmware and software. Agent 300 may be implemented in hardware and/or a combination of hardware and software and/or firmware. The software and/or firmware content may provide instructions to cause executing hardware to perform various operations, including some or all of the functions/features described above. Instructions to cause a machine/electronic device/hardware to perform the operations may be received via an article of manufacture. An article of manufacture may include a machine accessible medium having content to provide the instructions. A machine accessible medium includes any mechanism that provides (i.e., stores and/or transmits) information in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc.

Figure 4:
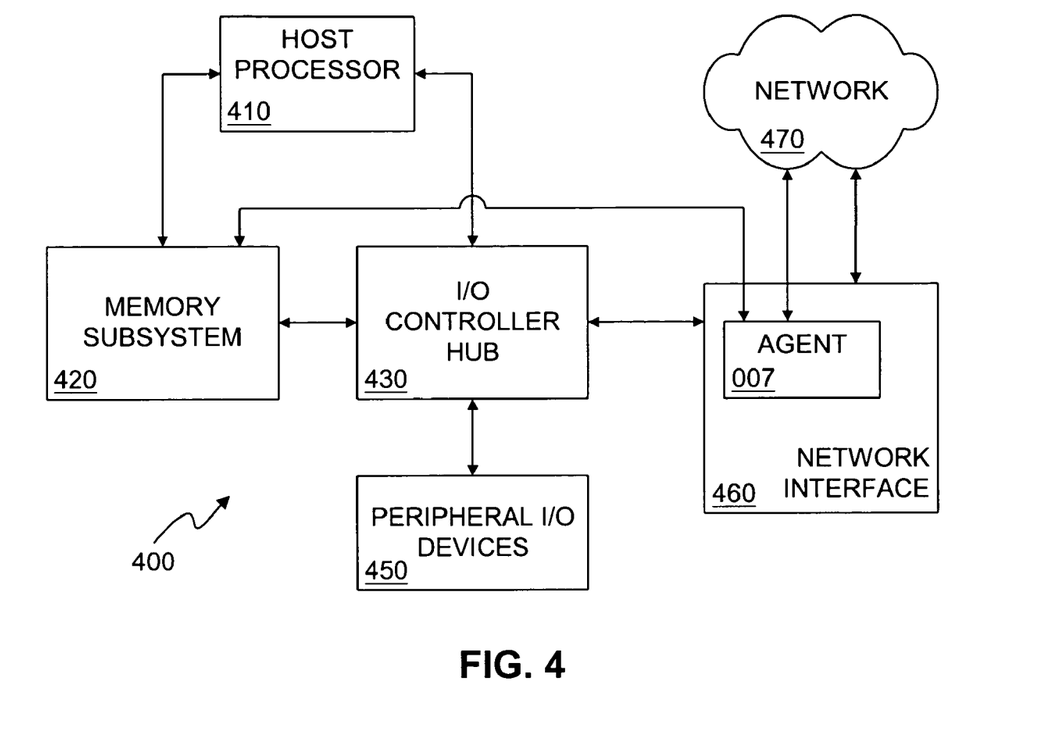
FIG. 4 is a block diagram of a system with a network interface having an embedded agent in accordance with one embodiment of the invention.

FIG. 4 is a block diagram of a system with a network interface having an embedded agent in accordance with one embodiment of the invention. The block diagram of FIG. 4 is intended to represent a broad category of electronic systems having network interfaces. The electronic system can be, for example, a desktop computer system, a mobile computer system, a server, a personal digital assistant (PDA), a cellular telephone, a set-top box, game console, satellite receiver, etc.

In one embodiment, host processor 410 may be coupled to memory subsystem 420, which includes memory and/or one or more memory controllers. Note that processor 410 may include a single processing core, or may have multiple processors/processing cores. Host processor 410 may also be interconnected with I/O controller hub (ICH) 430, which represents one or more control circuits that may include a processor, to interface with peripheral devices. ICH 430 may be a controller hub of a personal computing device as well as a control circuit of other electronic devices. In one embodiment, ICH 430 may provide an interface between system 400 and peripheral I/O devices 450 as well as between the system and network interface 460, which may provide an interface to external network 470. Network 470 may be any type of network, whether wired or wireless, for example, a local area network or a wide area network.

In one embodiment system 400 includes agent 007. Agent 007 may be a standalone circuit of system 400, may be embedded in another element of system 400, or may be part of the circuitry of an element of system 400. For example, agent 007 is shown in FIG. 4 embedded in network interface 460. While shown embedded in network interface 460, it will be appreciated that agent 007 may be embedded, or be part of another element of system 400, e.g., ICH 430. Agent 007 may be a separate entity of system 400, and/or be a virtual "entity" in that agent 007 is a representative entity of various functions performed in one or more subsystems. Agent 007 represents an embedded module or modules, whether in hardware or firmware, that performs particular functions. In one embodiment agent 007 may be considered to have at least two separate parts, which may be physically, or merely logically, separate.

In one embodiment agent 007 performs integrity checks on an initialization routine for network interface 460. In another embodiment agent 007 performs integrity checks for another subsystem of system 400, e.g., memory subsystem 420. For example, a BIOS or a hard disk controller of memory subsystem 420 may be verified by agent 007. Agent 007 may interconnect with a subsystem over a system bus or system interconnection, or over a private interconnection. For example, in one embodiment system 400 could be specifically designed with an interconnection between a module of agent 007 and a subsystem that is to be verified by agent 007.

Agent 007 may be interconnected with network 470. In one embodiment agent 007 interfaces with network 470 over a private network link or channel. In another embodiment agent 007 interfaces with network 470 over a network connection from network interface 460. With a network connection agent 007 can indicate system integrity to an entity external to system 400. In one embodiment agent 007 has a private interface with network 470, and is able to operate independently of, and transparent to host processor 410 and/or any applications/operating systems executed on host processor 410. As an entity independent of host processor 410, agent 007 may be less subject to compromise than an entity/system that is visible to host processor 410.

Operating independently of host processor 410 may also allow agent 007 to perform validation of various initialization procedures transparent to host processor 410, and prior to interaction of an application/operating system executed on host processor 410 with the device/subsystem being validated by agent 007. For example, if agent 007 validates memory subsystem 420, agent 007 may validate memory subsystem 420 on initialization of memory subsystem 420. The initialization of memory subsystem 420 may be an internal process that does not include interaction with host processor 410; memory subsystem 420 not interacting with host processor 410 until after the internal initialization process is complete. Thus, agent 007 may detect an integrity breach prior to host processor 410 interacting with memory subsystem 420, and may halt the initialization process, attempt a re-boot, perform diagnostics, etc. Agent 007 may also indicate the breach to a device listening on network 470. The device on network 470 may be able to perform remote diagnostics, perform updates, or other repair operations remotely through agent 007. Thus, agent 007 may enable remote correction of a problem on system 400.

Figure 5:
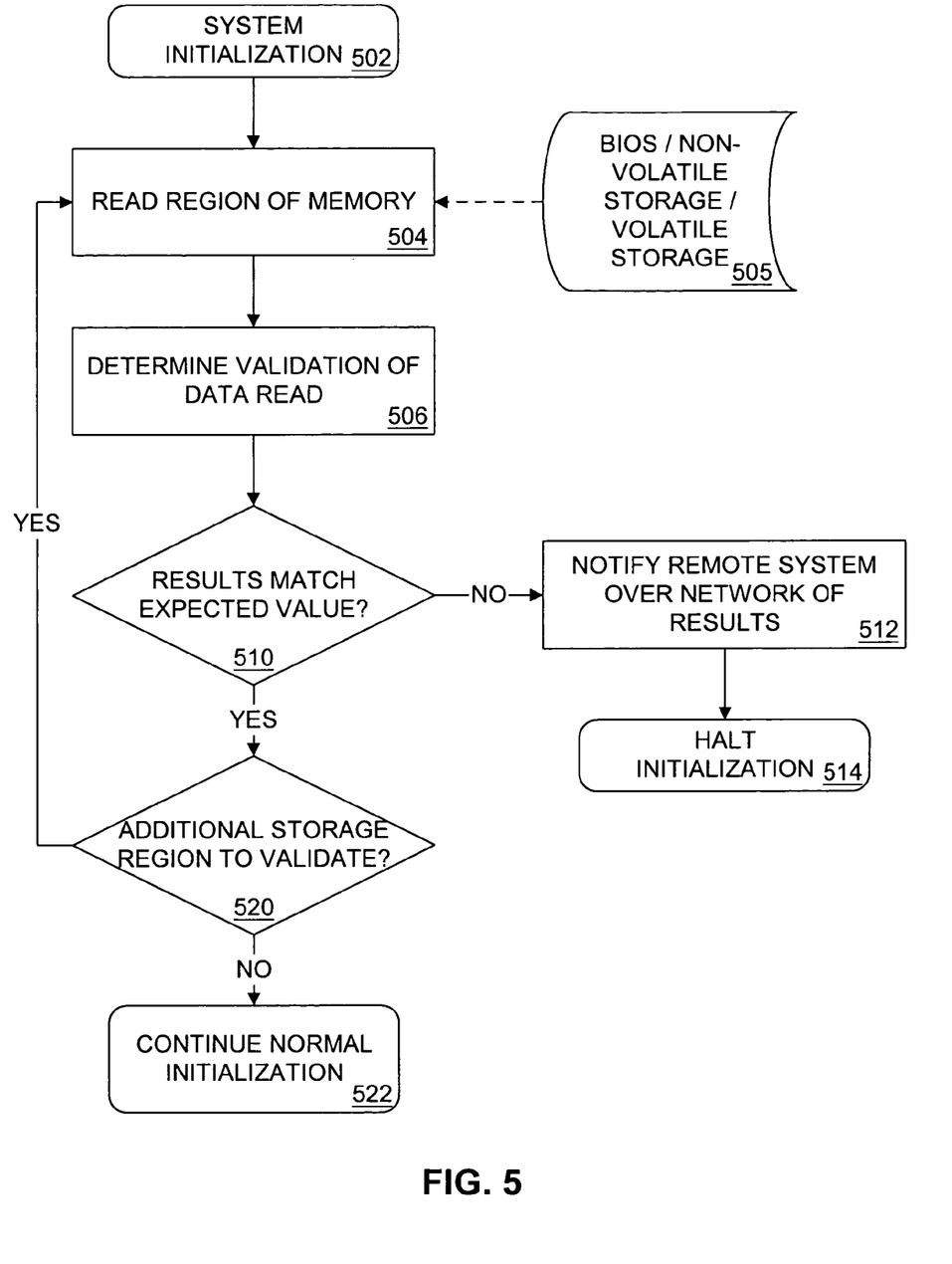
FIG. 5 is a flow diagram of validating a non-volatile storage on initialization in accordance with one embodiment of the invention.

FIG. 5 is a flow diagram of validating a non-volatile storage on initialization in accordance with one embodiment of the invention. A system enters a system initialization state, 502. A system includes all or a component part of an electronic device, for example, a circuit or group of circuits with an autonomous logic control. Thus, a system may include a computing device or an interface circuit of the computing device. A system may enter an initialization state, for example, after cycling of power to the system, at restart or reboot, or a point where a system exits its computational state and returns to a default state.

A region of a memory is read, 504. The memory may include BIOS, non-volatile storage, volatile storage, etc., 505. The region of memory may contain data and/or instructions relative to entering an execution state execution from an initialization state. Thus, the boot code, default values, etc., may be included, as well as information relating to bringing a main operating system and/or program up to execution. The region of memory may be all or part of a memory or storage device.

The validation of data accessed from the region is determined, 506. Validation may include reading data, performing a hash, performing a cryptographic hash, performing a checksum, accessing an expected value, etc. The validation determination may, depending on the design of the validating agent, produce a binary validation result (e.g., a binary of either validated or not validated) or other validation result (e.g., a byte, a vector, a value). It is determined whether the result(s) match an expected value, 510. The expected value may be a predefined, pre-computed, or predetermined version of the result that will be produced (e.g., a generated byte matches a defined "good" byte, a value produced for a known "good" state of the region matches the determined value, etc.).

In one embodiment a validation agent sends a notification or flag to a remote system only if a result match is not produced. In such a case, it may notify a remote system over a network of the results when the results and the expected value do not match, 512. If the results do match, then the process would continue along a different branch. In an alternate embodiment a notification is sent out even if the results match, such as having the remote system monitor correct boots. In another embodiment a correct operation indication may be normally sent out, and upon determining that the results of the validation do not match the expected results, no indication is given, thus notifying the remote system of the results. Thus, "notify" and "notification" are not intended to necessarily require transmission of information, and the lack of transmitting information may serve as notification. If results do not match, corrective action may be taken, e.g., halting initialization, 514. The halting of initialization may be performed directly by a validation agent, or may be caused to happen by the remote system in response to the notification. Other corrective action may be performed.

Notifying the remote system allows an agent to indicate to a remote entity a problem as soon as the problem is detected. In addition, it may allow the corrupted system to benefit as quickly as possible from the resources of the remote entity to attempt to make corrective action to fix the problem.

If the validation is successful, it is determined whether an additional storage region should be validated, 520. This process may repeat for any number of regions. If there are no more regions to validate and there are no breaches, normal initialization may be continued, 522.

Figure 6:
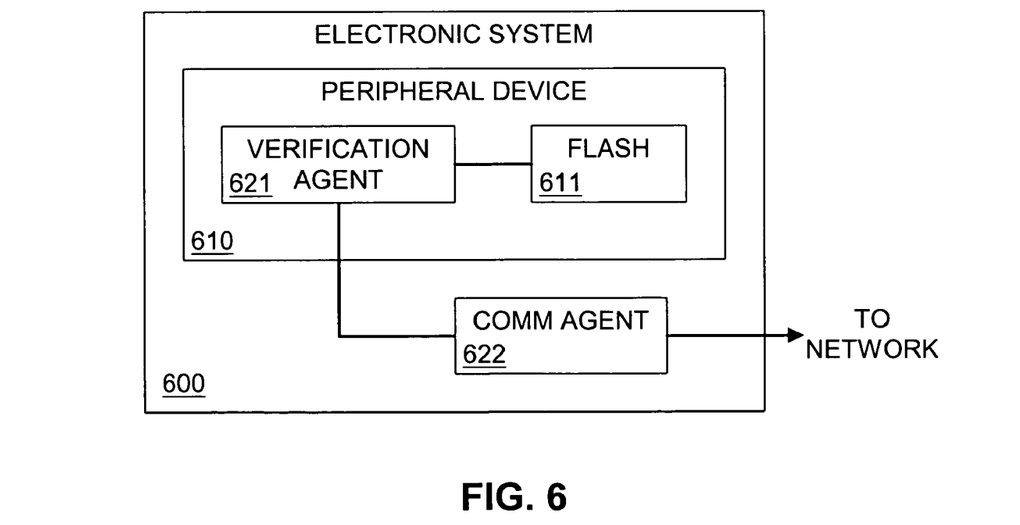
FIG. 6 is a block diagram of an electronic system with cooperating agents in accordance with one embodiment of the invention.

FIG. 6 is a block diagram of an electronic system with cooperating agents in accordance with one embodiment of the invention. Electronic system 600 includes peripheral device 610, which may include an I/O device, a video device/controller, a memory subsystem, or other device that is not the main computational engine of electronic system 600. Peripheral device 610 may include devices and/or subsystems as described above with reference to other figures.

Peripheral device 610 includes flash 611 that has at least a portion of which that will be validated by verification agent 621. Flash 611 may include boot sequences and/or settings and/or instructions for boot-up that peripheral device 610 uses for internal setup when peripheral device is powered up. Note that although specified as a flash device, another type of memory device in peripheral device 610 may be checked by verification agent 621. Verification agent 621 may access and perform a verification procedure on some or all of flash 611. In one embodiment verification agent 621 performs a hash function to determine a result that could be based on or derived from data in flash 611.

Verification agent 621 may work in conjunction with another agent, that could also be a standalone agent, an embedded agent, a combination of modules (e.g., hardware, software), etc. For example, in one embodiment electronic system 600 includes communication agent 622 that has a connection to a network. Thus, verification agent 621 may produce a validation result that will be transmitted to an entity (e.g., a remote administrator) over a network. In one embodiment verification agent 621 does not have its own network connection. Alternatively, verification agent 621 may have its own network connection, but it may use a different network connection for particular traffic, such as notification to an external network of particular results, etc.

Verification agent 621 may attempt to indirectly access a network connection for a number of reasons, including: to access a network connection because it lacks a direct network connection, to access a private network connection, to access a more secure network connection, to aggregate notification traffic with other notification traffic, to provide all notification traffic to an external entity over a single network connection, etc. Thus, even if verification agent 621 has a network connection, in one embodiment verification agent 621 sends signals over a network via communication agent 622. In one embodiment the interconnection between verification agent 621 and communication agent 622 is secure/encrypted, and/or may be private/isolated from other components of electronic system 600.

Thus, verification agent 621 may indicate a verified result, or send results for confirmation to another entity to determine whether a portion of flash 611 has not suffered a breach in integrity. Communication agent 622 may operate in conjunction with verification agent 621 by receiving notifications and/or other signals from verification agent 621 and transmitting them to a remote location over a network.

Reference herein to "embodiment" means that a particular feature, structure, or characteristic described in connection with the described embodiment is included in at least one embodiment of the invention. Thus, the appearance of phrases such as "in one embodiment," or "in alternate an embodiment" may describe various embodiments of the invention, and may not necessarily all refer to the same embodiment. Besides what is described herein, it will be appreciated that various modifications may be made to embodiments of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
   a non-volatile memory storing initialization information for a hardware platform, the initialization information including configuration settings for hardware components of the hardware platform, as well as initialization sequence code and hardware device driver data, the hardware platform providing hardware for a host operating environment to execute on the hardware platform;
   a validation circuit to read, at initialization of the host operating environment on the hardware platform, at least a portion of the initialization information of the non-volatile memory, and determine integrity of the read portion, including performing a validation algorithm to verify one or more of the configuration settings have expected values, and that the boot sequence code and hardware device driver data have expected values, wherein the validation circuit has operating logic that is separate from the non-volatile memory and the initialization information, and the validation circuit is inaccessible to the host operating environment; and
   a transmitter to indicate the integrity determination over a private network link to a remote network administration system separate from the hardware platform, the private network link being a communication channel inaccessible to the host operating environment.

2. An apparatus according to claim 1, wherein the validation circuit to determine the integrity comprises the validation circuit to perform a hash function to produce a hash result to compare with an expected result.

3. An apparatus according to claim 2, wherein the validation circuit to determine the integrity with a hash function comprises the validation circuit to determine the integrity with a cryptographic hash.

4. An apparatus according to claim 1, wherein the transmitter to indicate the integrity determination over the private network link comprises the transmitter to indicate the integrity determination over a link dedicated to transmission of validation information.

5. A method for an embedded agent, comprising:
   reading at least a portion of a non-volatile memory storing system settings, including initialization information for a hardware platform, the initialization information including configuration setting for hardware component of the hardware platform, as well as initialization sequence code and hardware device driver data, the hardware platform providing hardware for a host operating environment to execute on the hardware platform;
   validating with an embedded agent, at system initialization of the host operating environment on the hardware platform, the at least a portion of the initialization information of the non-volatile memory, including performing a validation algorithm to verify one or more of the configuration setting have expected values, and that the boot sequence code and hardware device driver data have expected values, the embedded agent functionally independent of a system initialization circuit that applies the system settings of the portion of memory at system initialization, and the embedded agent being separate from the non-volatile memory and the initialization information, and being inaccessible to the host operating environment; and
   the embedded agent selectively transmitting a result of the validating over a private network link to a remote network administration entity separate from the hardware platform, the private network link being a communication channel inaccessible to the host operating environment.

6. A method according to claim 5, wherein performing the validation algorithm comprises hashing the portion of the memory with an algorithm employing a cryptographic key.

7. A method according to claim 5, wherein validating with the embedded agent functionally independent of the system initialization circuit comprises validating with the embedded agent functionally independent of a basic input output system (BIOS).

8. A method according to claim 5, wherein validating with the functionally independent embedded agent comprises validating with the embedded agent that is read-inaccessible to the system initialization circuit.

9. A method according to claim 5, wherein validating with the functionally independent embedded agent comprises validating with the embedded agent that is write-inaccessible to the system initialization circuit.

10. A method according to claim 5, wherein selectively transmitting the result comprises transmitting the result only if the result indicates a failed validation.

11. A method according to claim 5, wherein transmitting the result to the remote system further comprises transmitting the result over a private bus to an additional embedded circuit having network access, the additional embedded circuit transmitting the result over a network connection.

12. A method according to claim 5, wherein transmitting the result to the remote system comprises transmitting the result over a secure network connection.

13. An article comprising a machine accessible medium having content to provide instructions that when executed cause a machine to perform operations including:
  reading at least a portion of a non-volatile memory storing system settings, including initialization information for a hardware platform, the initialization information including configuration settings for hardware components of the hardware platform, as well as initialization sequence code and hardware device driver data, the hardware platform providing hardware for a host operating environment to execute on the hardware platform;
  validating with an embedded circuit, at system initialization of the host operating environment on the hardware platform, the at least a portion of the initialization information of the non-volatile memory, including performing a validation algorithm to verify one or more of the configuration setting have expected values, and that the boot sequence code and hardware device driver data have expected values, the embedded circuit functionally independent of a system initialization circuit that applies the system settings at system initialization, and the embedded circuit being separate from the non-volatile memory and the initialization information, and being inaccessible to the host operating environment; and
  the embedded circuit selectively transmitting a result of the validating over a private network connection to a remote network administration system separate from the hardware platform, the private network link being a communication channel inaccessible to the host operating environment.

14. An article of manufacture according to claim 13, wherein the instructions to cause a machine to perform operations including performing the checking algorithm comprises the instructions to cause a machine to perform operations including hashing the portion of the memory with an algorithm employing a cryptographic key.

15. An article of manufacture according to claim 13, wherein the instructions to cause a machine to perform operations including validating with the embedded circuit functionally independent of the system initialization circuit comprises the instructions to cause a machine to perform operations including validating with the embedded circuit, the embedded circuit being inaccessible to the system initialization circuit to write.

16. An article of manufacture according to claim 13, wherein the instructions to cause a machine to perform operations including selectively transmitting the result comprises the instructions to cause a machine to perform operations including transmitting the result only if the result indicates a failed validation.

17. An apparatus according to claim 1, wherein the validation circuit comprises a processor circuit of a network interface card.

18. A method according to claim 5, wherein transmitting the result of the validating over the private network link to the remote administration entity comprises transmitting the result to a preconfigured network address.

* * * * *

UNITED STATES PATENT AND TRADEMARK OFFICE
CERTIFICATE OF CORRECTION

PATENT NO. : 7,558,966 B2  Page 1 of 1
APPLICATION NO. : 10/865354
DATED : July 7, 2009
INVENTOR(S) : Durham et al.

It is certified that error appears in the above-identified patent and that said Letters Patent is hereby corrected as shown below:

In column 12, at line 26 delete, "setting" and insert --settings--.

In column 13, at line 28 delete, "setting" and insert --settings--.

In column 13, at line 32 after, "settings" insert --of the portion of memory--.

Signed and Sealed this

Twenty-third Day of November, 2010

David J. Kappos
*Director of the United States Patent and Trademark Office*